United States Patent
Takeda

(10) Patent No.: US 12,332,441 B2
(45) Date of Patent: Jun. 17, 2025

(54) DISPLAY DEVICE AND OPTICAL UNIT

(71) Applicant: SEIKO EPSON CORPORATION, Tokyo (JP)

(72) Inventor: Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 737 days.

(21) Appl. No.: 17/512,698

(22) Filed: Oct. 28, 2021

(65) Prior Publication Data
US 2022/0137414 A1 May 5, 2022

(30) Foreign Application Priority Data
Oct. 29, 2020 (JP) .................................. 2020-181266

(51) Int. Cl.
*G02B 27/01* (2006.01)
*G02B 27/09* (2006.01)

(52) U.S. Cl.
CPC ..... *G02B 27/0172* (2013.01); *G02B 27/0972* (2013.01); *G02B 27/0977* (2013.01); *G02B 2027/0178* (2013.01)

(58) Field of Classification Search
CPC ................ G02B 27/026; G02B 27/024; G02B 2027/0196; G02B 2027/0178; G02B 27/0172
See application file for complete search history.

(56) References Cited

U.S. PATENT DOCUMENTS

| | | | | |
|---|---|---|---|---|
| 5,933,279 A | * | 8/1999 | Yamazaki | .......... G02B 17/0832 |
| | | | | 359/635 |
| 6,246,527 B1 | * | 6/2001 | Hayakawa | .......... G02B 27/0025 |
| | | | | 359/630 |
| 6,822,770 B1 | * | 11/2004 | Takeyama | .......... G02B 27/0172 |
| | | | | 359/13 |
| 9,851,630 B2 | * | 12/2017 | Kang | .................... G02B 3/0043 |
| 2013/0027784 A1 | | 1/2013 | Takahashi | |
| 2017/0184854 A1 | | 6/2017 | Takagi et al. | |
| 2020/0018966 A1 | | 1/2020 | Komatsu et al. | |
| 2020/0225484 A1 | | 7/2020 | Takagi et al. | |
| 2021/0063749 A1 | * | 3/2021 | Takeda | ..................... G02B 5/04 |

FOREIGN PATENT DOCUMENTS

| | | | | |
|---|---|---|---|---|
| CN | 110703441 | | 1/2020 | |
| EP | 2902838 | A1 * | 8/2015 | ......... G02B 27/0101 |
| JP | 2004287278 | | 10/2004 | |
| JP | 2005331767 | | 12/2005 | |

(Continued)

*Primary Examiner* — Ricky L Mack
*Assistant Examiner* — Journey F Sumlar
(74) *Attorney, Agent, or Firm* — JCIPRNET

(57) ABSTRACT

A display device includes an image element, a prism mirror configured to cause imaging light emitted from the image element to be incident on a light incident surface, to reflect the imaging light by an inner reflection surface, and to emit the imaging light from a light emission surface, thereby emitting the imaging light so that the imaging light is returned in an inclined direction, a see-through mirror configured to reflect the imaging light emitted from the prism mirror toward a pupil position, and a basic aperture diaphragm configured to limit the passage of the imaging light incident on the light incident surface of the prism mirror.

17 Claims, 11 Drawing Sheets

(56) References Cited

FOREIGN PATENT DOCUMENTS

| | | |
|---|---|---|
| JP | 2007079031 | 3/2007 |
| JP | 2009251194 | 10/2009 |
| JP | 2013029704 | 2/2013 |
| JP | 2017116773 | 6/2017 |
| JP | 2020034722 | 3/2020 |
| JP | 2020112714 | 7/2020 |
| WO | WO-2013077259 A1 * 5/2013 ............. G02B 5/001 |

* cited by examiner

DISPLAY DEVICE AND OPTICAL UNIT

The present application is based on, and claims priority from JP Application Serial Number 2020-181266, filed Oct. 29, 2020, the disclosure of which is hereby incorporated by reference herein in its entirety.

BACKGROUND

1. Technical Field

The present disclosure relates to a see-through type display device and an optical unit that enable observation of a virtual image, and in particular, relates to the display device and the optical unit in which imaging light from an image source is incident on a see-through mirror and the reflected light from the see-through mirror is observed.

2. Related Art

As the see-through type display device, there is a device that forms a zigzag optical path by two obliquely incident type mirrors, and causes the imaging light from a display element to be incident on the user's eye through the zigzag optical path (see, JP-A-2020-34722).

In the see-through type display device such as JP-A-2020-34722, the arrangement of optical components is restricted from the viewpoint of securing a region for visually recognizing externals, and from the viewpoint of increasing the degree of freedom in appearance, and in particular, the position of the intermediate pupil at which an aperture diaphragm is to be arranged is partially within the optical element, so that the aperture diaphragm could not be installed.

SUMMARY

A display device according to one aspect of the present disclosure includes an image element that emits an imaging light, a projection lens that transmits the imaging light, a prism mirror that has a light incident surface on which the imaging light emitted from the projection lens is incident, an inner reflection surface that reflects the imaging light from the light incident surface, and a light emission surface that emits the imaging light from the inner reflection surface, a see-through mirror that reflects the imaging light emitted from the prism mirror toward a pupil position, and a first diaphragm that limits passage of the imaging light and that is arranged at a position between the projection lens and the light incident surface or a position between the light emission surface of the prism mirror and the see-through mirror.

DESCRIPTION OF EXEMPLARY EMBODIMENTS

First Embodiment

Hereinafter, a display device according to a first exemplary embodiment of the present disclosure and an optical unit incorporated therein will be described with reference to FIGS. 1 to 3 and the like.

Figure 1:
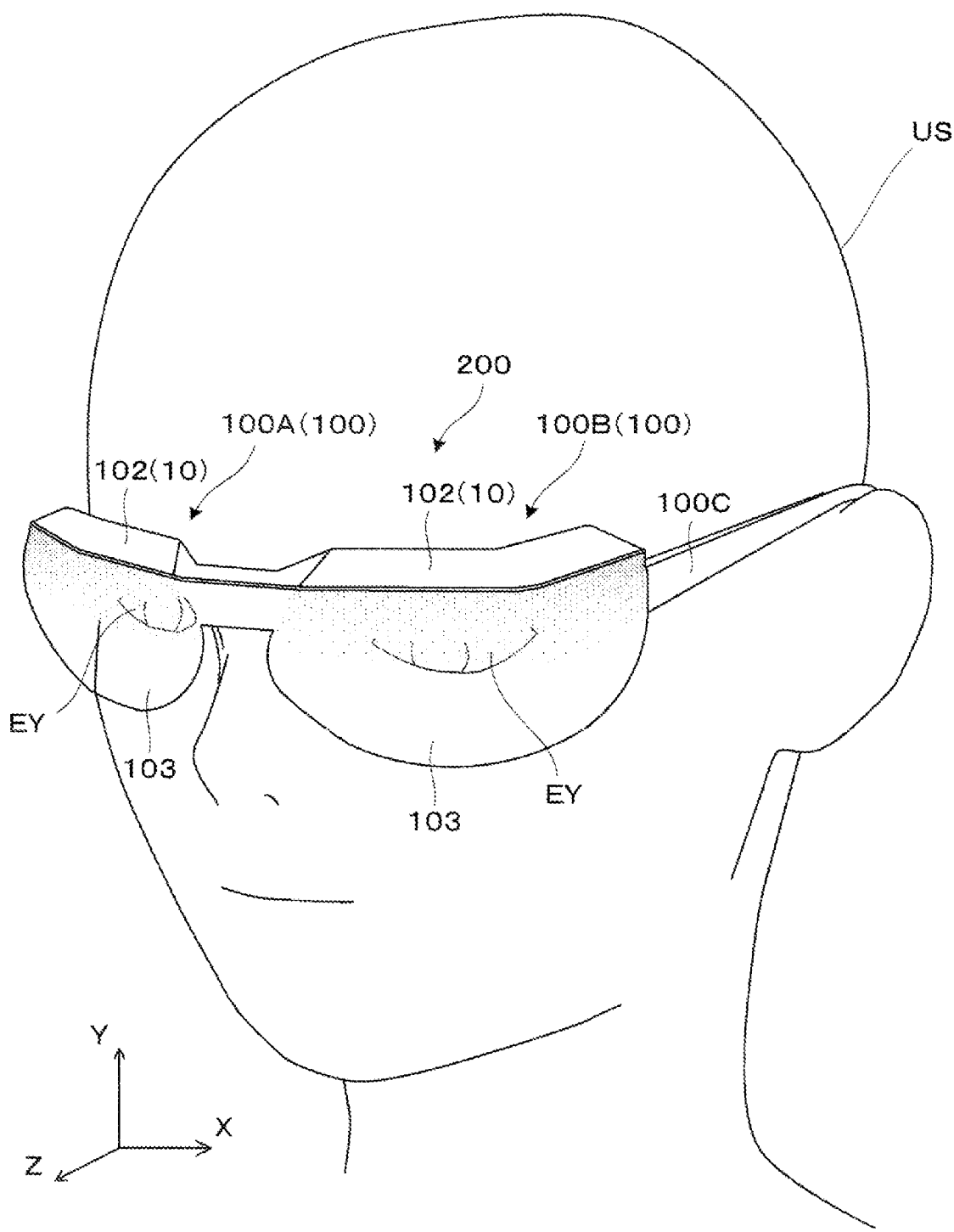
FIG. 1 is an external perspective view illustrating a wearing state of a display device of a first exemplary embodiment.

FIG. 1 is a diagram illustrating a wearing state of a head-mounted display (hereinafter, also referred to as an HMD) 200, and the HMD 200 causes an observer or a wearer US who wears the HMD 200 to recognize an image as a virtual image. In FIG. 1 and the like, X, Y, and Z are an orthogonal coordinate system, a +X direction corresponds to a lateral direction in which both eyes EY of the observer or wearer US wearing the HMD 200 or a display device 100 are aligned, a +Y direction corresponds to an upward direction orthogonal to the lateral direction in which both eyes of the wearer US are aligned, and a +Z direction corresponds to a forward direction or a front direction of the wearer US. ±Y directions are parallel to a vertical axis or a vertical direction.

The HMD 200 includes a first display device 100A for the right eye, a second display device 100B for the left eye, and a support device 100C in a temple shape which supports the display devices 100A and 100B. The first display device 100A includes a display driving unit 102 arranged at an upper portion thereof and an appearance member 103 that has a spectacle lens shape and covers the front of the eye. Similarly, the second display device 100B includes the display driving unit 102 arranged at an upper portion thereof and the appearance member 103 that has a spectacle lens shape and covers the front of the eye. In the first display device 100A and the second display device 100B, the display driving unit 102 is a main part that forms an image, and the display driving unit 102 is also referred to as an image source 10. The support device 100C supports an upper end side of the appearance member 103 via the display driving unit 102. The display device 100A and the display device 100B are arranged with the right and left sides reversed, and the display device 100A for the right eye will be described below as a representative of the display device 100.

Figure 2:
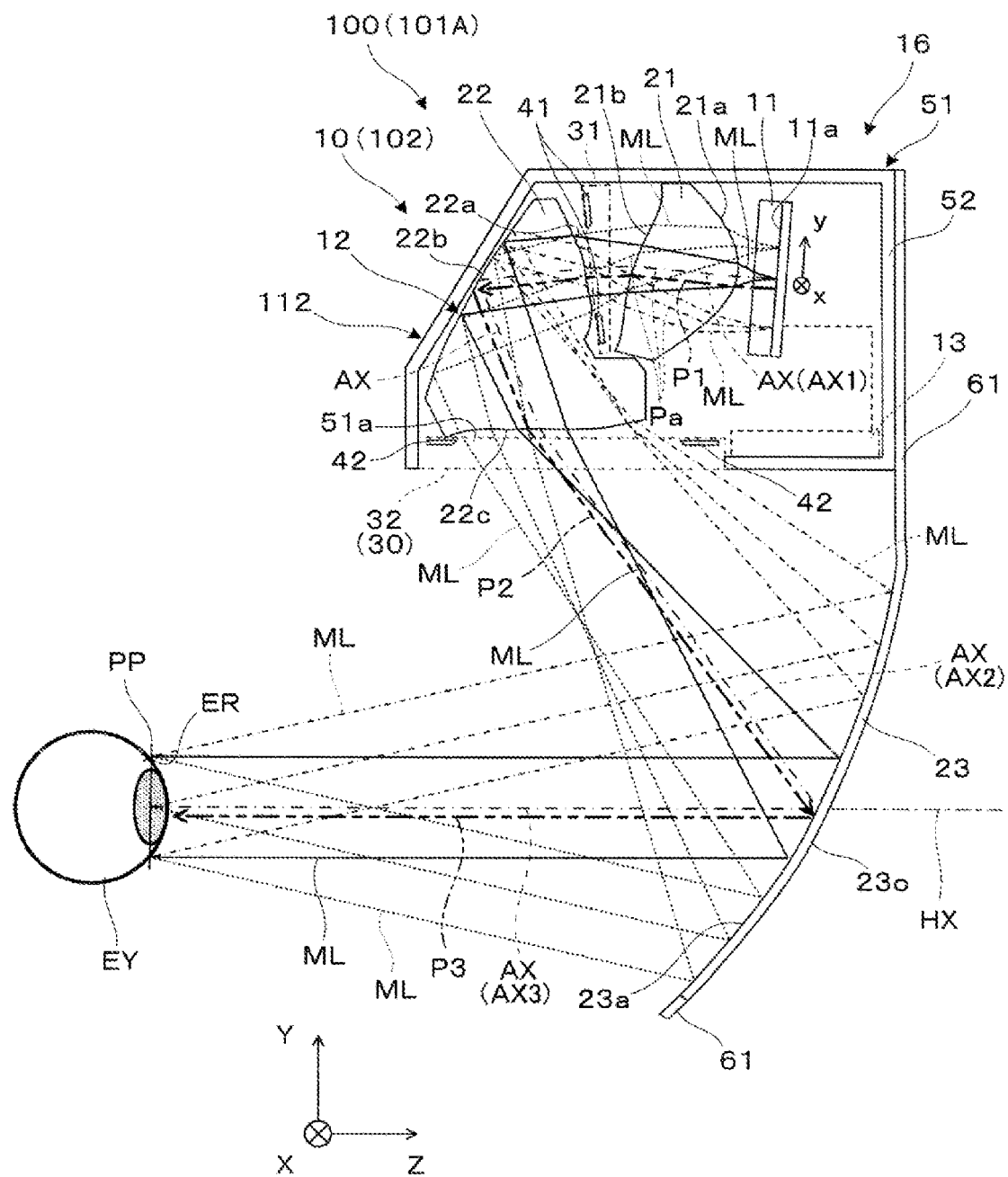
FIG. 2 is a side cross-sectional view illustrating an internal structure of the display device.
Figure 3:
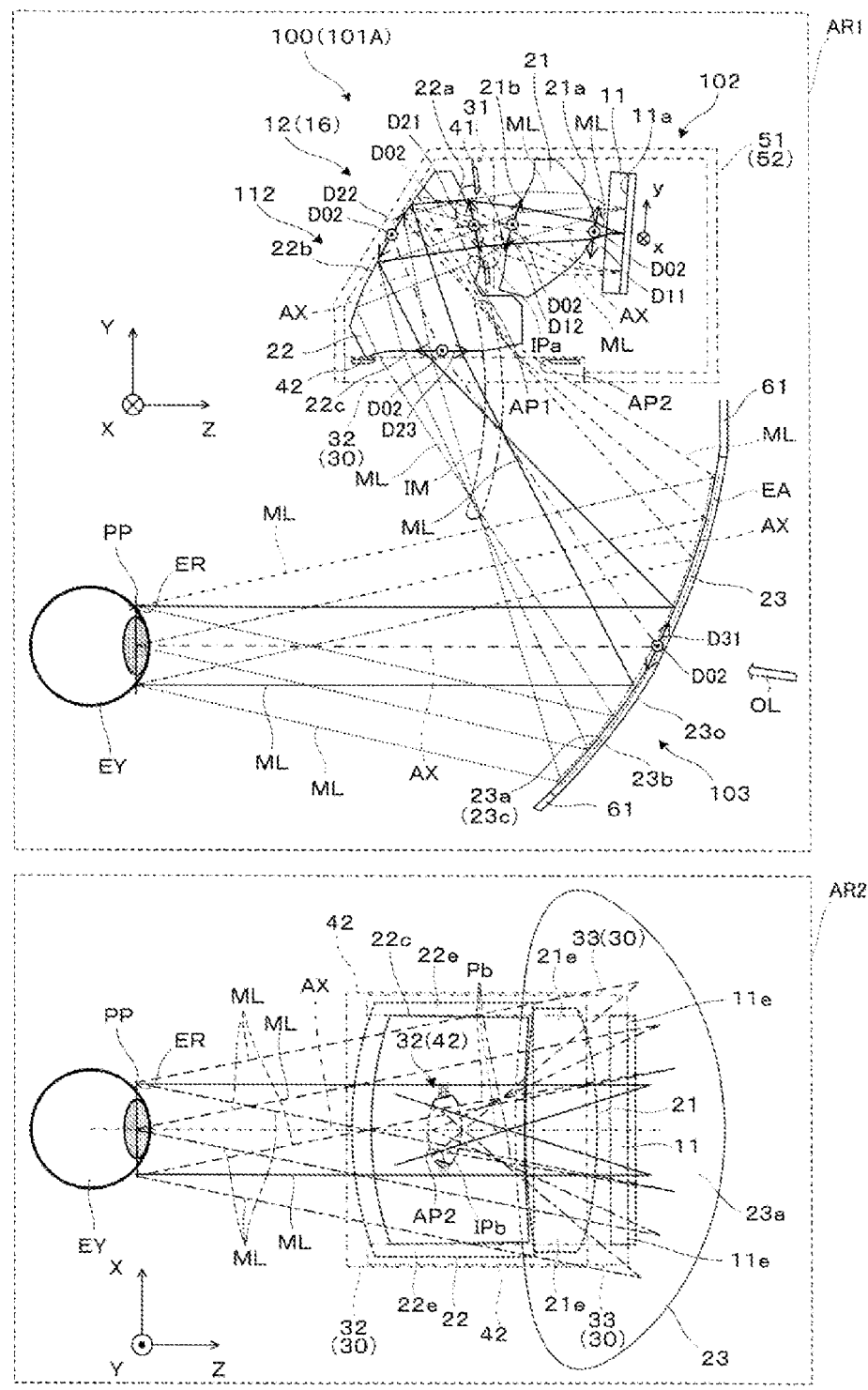
FIG. 3 is a side cross-sectional view and a partial cross-sectional plan view of the display device.

FIG. 2 is a side cross-sectional view illustrating the optical structure of the display device 100. As illustrated, the display device 100 includes an image element 11, an imaging optical system 12, and a display control circuit 13. However, in the present specification, the display device 100 in which the display control circuit 13 is excluded is also referred to as the display device 100 from the viewpoint of achieving an optical function. The image element 11 and the display control circuit 13 are supported inside a case 51 which is an outer frame of the display driving unit 102 illustrated in FIG. 1, and a part of the imaging optical system 12 is also stored and supported inside the case 51 of the display driving unit 102.

The image element 11 is a self-luminous type display device. The image element 11 is, for example, a micro LED display, and forms a color still image or moving image on a two-dimensional display surface 11a. The image element 11 is arranged along an XY plane which is slightly rotated and tilted around an X-axis with respect to the XY plane. The image element 11 is driven by the display control circuit 13 to perform a display operation. The image element 11 is not limited to the micro LED display, and can be replaced with a display device which employs organic electro-luminescence (organic EL), inorganic EL, organic LED, a laser array, a quantum dot emission type element, and the like. The image element 11 is not limited to the self-luminous type imaging light generating device, and may include an LCD or another light modulating element, and may form an image by illuminating the light modulating element with a light source such as a backlight. As the image element 11, a liquid crystal on silicon (LCOS) (LCoS is a registered trademark), a digital micromirror device, and the like may be used instead of the LCD.

The imaging optical system 12 includes a projection lens 21, a prism mirror 22, and a see-through mirror 23, and the case 51 described later is a part of the imaging optical system 12. In the present specification, the imaging optical system 12 is also referred to as an optical unit 16. In the present embodiment, the optical path from the image element 11 to the prism mirror 22 is arranged above the upper end of the see-through mirror 23, but it may be arranged at a position partially lower than the upper end of the see-through mirror 23 in a range that does not obstruct the optical path of imaging light ML that is incident on the eye EY. That is, the image element 11, the projection lens 21, and the prism mirror 22 may be arranged at a position partially lower than the upper end of the see-through mirror 23 in a range that does not obstruct the optical path of the imaging light ML that is incident on the eye EY.

The projection lens 21 transmits the imaging light ML emitted from the image element 11 and causes the imaging light ML to be incident on the prism mirror 22. The projection lens 21 collects the imaging light ML emitted from the image element 11 into a state close to the parallel luminous flux. The projection lens 21 is a single lens and has an incident surface 21a and an emission surface 21b. The prism mirror 22 has a light incident surface 22a, an inner reflection surface 22b, and a light emission surface 22c, and is configured to cause the imaging light ML emitted from the projection lens 21 to be incident on the light incident surface 22a, totally reflect the imaging light ML by the inner reflection surface 22b, and emit the imaging light ML from the emission surface 22c. At this time, the prism mirror 22 emits the imaging light ML, that is incident thereon from the front, so as to fold back the imaging light ML in a direction inclined with respect to the direction in which an incident direction is reversed (the direction of the light source seen from the prism mirror 22). In the case of an optical system that is eccentric in the up-down direction as in the present embodiment, the front direction of the optical path includes a direction within a range of approximately 45° upward and downward with respect to the +Z direction, and a direction inclined with respect to the front direction (that is, the direction in which the incident direction is reversed) includes a direction within a range of approximately 45° upward and downward with respect to an intermediate direction that forms 45° with respect to the +Z direction and the −Y direction. The see-through mirror 23 reflects the imaging light ML emitted from the prism mirror 22 toward a pupil position PP. The pupil position PP is at a position where the imaging light ML from each point on a display surface 11a is incident thereon so as to be superimposed from an angular direction corresponding to the position of each point on the display surface 11a, in a predetermined divergent state or parallel state. The FOV (field of view) of the display device 100 including the illustrated imaging optical system 12 is, for example, 44°. A display area of the virtual image by the display device 100 is rectangular, and the above-described 44° is a diagonal direction.

The imaging optical system 12, that is, the optical unit 16 includes a basic aperture diaphragm 41 arranged to face the light incident surface 22a of the prism mirror 22 between the projection lens 21 and the prism mirror 22. The optical unit 16 includes an additional aperture diaphragm 42 arranged to face the light emission surface 22a of the prism mirror 22 between the prism mirror 22 and the see-through mirror 23.

The basic aperture diaphragm 41 is a part of a first diaphragm member 31 and is integrated with the first diaphragm member 31. The basic aperture diaphragm 41 limits the imaging light ML incident on the light incident surface 22a of the prism mirror 22 into a necessary range. More specifically, the basic aperture diaphragm 41 functions as an aperture diaphragm with respect to a first direction or the up-down direction parallel to a predetermined plane (a plane parallel to the YZ plane) that includes an optical axis portion AX1 of the imaging light ML incident on the prism mirror 22 and an optical axis portion AX2 of the imaging light ML emitted from the prism mirror 22. Here, the first direction approximately is a direction corresponding to a first direction D21 illustrated in FIG. 3, which will be described later.

On the other hand, the additional aperture diaphragm 42 is a part of a second diaphragm member 32 and is integrated with the second diaphragm member 32. The additional aperture diaphragm 42 limits the imaging light ML emitted from the light emitting surface 22c of the prism mirror 22 and incident on the see-through mirror 23 into a necessary range. More specifically, the additional aperture diaphragm 42 functions as an aperture diaphragm with respect to a second direction or the lateral direction perpendicular to the predetermined plane (the plane parallel to the YZ plane) that includes the optical axis portion AX1 of the imaging light ML incident on the prism mirror 22 and the optical axis portion AX2 of the imaging light ML emitted from the prism mirror 22. Here, the second direction corresponds to the lateral X direction and is a direction corresponding to a second direction D02 illustrated in FIG. 3, which will be described later.

In the light beam path exemplified in the present embodiment, the basic aperture diaphragm 41 functions not only as an aperture diaphragm with respect to the up-down first direction, but also as an aperture diaphragm with respect to the lateral second direction, although it is not sufficient, and is relatively important in terms of the function. The additional aperture diaphragm 42 is complementary to the diaphragm function of the basic aperture diaphragm 41, and can be omitted in the end. From this point of view, the terms of basic and additional are given. Note that the aperture diaphragm is a diaphragm that determines the numerical aperture related to the resolution, and is generally arranged at a location where the main beams intersect, and has a role of efficiently blocking unnecessary light that does not contribute to the imaging while ensuring the passage of necessary light that contributes to the imaging. However, when the locations where the main beams intersect with each other are dispersed at different positions along the optical axis AX as in the optical path of the present embodiment, for example, the imaging performance can be improved by providing the aperture diaphragm at each of the plurality of locations where the main beams intersect or in the vicinity thereof.

In the above, it is said that the basic aperture diaphragm 41 is more important in terms of the function and the additional aperture diaphragm 42 is auxiliary or complementary. However, due to the change of the light beam path, an aperture diaphragm located at the position of the additional aperture diaphragm 42 may become more important in terms of the function, and an aperture diaphragm located at the position of the basic aperture diaphragm 41 may be auxiliary or complementary. In such a case, an aperture diaphragm arranged to oppose to the light emission surface 22c of the prism mirror 22 (arranged at the position of the additional aperture diaphragm 42 in the drawing) is referred to as a basic aperture diaphragm, and an aperture diaphragm arranged to oppose to the light incident surface 22a of the prism mirror 22 (arranged at the position of the basic aperture diaphragm 41 in the drawing) is referred to as an additional aperture diaphragm. With respect to the above-described aperture diaphragms 41 and 42, a diaphragm located upstream of the light beam path is referred to as a first aperture diaphragm, and a diaphragm located downstream or after thereof in the light beam path is referred to as a second aperture diaphragm, including a case in which it is unclear which of the plurality of aperture diaphragms 41 and 42 is functionally important. Whether the first aperture diaphragm or the second aperture diaphragm is used as the basic aperture diaphragm, is determined in consideration of the degree of blocking unnecessary light that does not contribute to the imaging, but it is not intended to too strictly distinguish them.

The projection lens 21 and the prism mirror 22 are stored in the case 51 together with the image element 11. The case 51 is a combination of a main body 52 and a holding member 30. The main body 52 is made of a material having light-shielding property, and supports the display control circuit 13 that operates the image element 11. The main body 52 is made of a metal material or a resin material. In a case of the resin material, a black light-shielding material may be applied to the inner surface side. The main body 52 supports the image element 11, the projection lens 21, and the prism mirror 22 via the holding member 30. The holding member 30 is also made of the light-shielding material. The case 51 has an aperture 51a in the second diaphragm member 32 of the holding member 30, and allows the display driving unit 102 or the image source 10 to emit the imaging light ML toward the outside. The imaging light ML emitted to the outside of the display driving unit 102 is incident on the inside of the see-through mirror 23.

In the illustrated example, the display control circuit 13 is arranged inside the case 51, but the display control circuit 13 can also be arranged outside the case 51. The image element 11 also need not be arranged in the case 51, but an opening for the image element 11 may be provided at the case 51, and the image element 11 may be fixed to the case 51 so that the display surface 11a faces the inside of the case 51 through the opening.

The case 51 supports the see-through mirror 23 via a support plate 61. In this case, the see-through mirror 23 is stably supported with respect to the prism mirror 22 and the like via the case 51. The see-through mirror 23 and the support plate 61 correspond to the appearance member 103 illustrated in FIG. 1.

The imaging optical system 12 is an off-axis optical system 112 due to the see-through mirror 23 being a concave mirror. In the case of the present embodiment, the projection lens 21, the prism mirror 22, and the see-through mirror 23 are arranged non-axisymmetric and have a non-axisymmetric optical surface. Note that the imaging optical system 12 is an off-axis optical system 112 means that, in the optical elements 21, 22, and 23 constituting the optical unit 12, the optical path is folded as a whole before and after the light beam is incident on at least one reflection surface or refraction surface. In this imaging optical system 12, that is, the off-axis optical system 112, the optical axis AX is folded so that the optical axis AX extends along an off-axis plane (a plane parallel to the YZ plane) that corresponds to the paper surface. In this imaging optical system 12, the optical elements 21, 22, and 23 are arranged along the off-axis plane by folding the optical axis AX in the off-axis plane parallel to the YZ plane. The imaging optical system 12 includes the optical axis portions AX1, AX2, and AX3 that are arranged along the off-axis plane (the plane parallel to the YZ plane), which is a predetermined reference plane, and are inclined with respect to each other before and after the reflection surface. The overall optical axis AX extends along the optical path of the main beam emitted from the center of the image element 11 and passes through the center of an eye ring ER corresponding to the eye point or the pupil. The optical axis AX is arranged in a Z-shape by the plurality of optical axis portions AX1, AX2, and AX3 when viewed in a cross-section parallel to the YZ plane. In other words, in the off-axis plane parallel to the YZ plane, an optical path P1 from the projection lens 21 to the inner reflection surface 22b, an optical path P2 from the inner reflection surface 22b to the see-through mirror 23, and an optical path P3 from the see-through mirror 23 to the pupil position PP are folded back in the Z-shape in two stages. The imaging optical system 12 is arranged vertically. That is, the off-axis plane (the plane parallel to the YZ plane), which is the predetermined reference plane, extends parallel to the up-down Y direction. In this case, the optical elements 21, 22, and 23 constituting the display device 100 are arranged such that height positions thereof in the up-down direction are varied, and it is possible to prevent an increase in the lateral width of the display device 100.

In the imaging optical system 12, the optical path P1 from the projection lens 21 to the inner reflection surface 22b is in a state close to parallel to the Z direction. That is, in the optical path P1, the optical axis portion AX1 extends substantially parallel to the Z direction or the front direction. As a result, the projection lens 21 is arranged so as to be sandwiched between the prism mirror 22 and the image element 11 in the Z direction or the front direction. It is desirable that the optical axis portion AX1 in the optical path P1 is within a range of approximately −30° to +30° on average, in the Z direction, with the downward direction being negative. By setting the optical axis portion AX1 of the optical path P1 to be in a state of equal to or greater than −30° downward in the Z direction, it is possible to prevent the projection lens 21 and the image element 11 from interfering with the see-through mirror 23. Further, by setting the optical axis portion AX1 of the optical path P1 to be in a state of equal to or less than +30° upward in the Z direction, it is possible to prevent the projection lens 21 and the image element 11 from protruding upward and becoming conspicuous in appearance. It is desirable that the optical axis portion AX2 in the optical path P2 is within a range of approximately −70° to −45° on average, in the Z direction, with the downward direction being negative. By setting the optical axis portion AX2 of the optical path P2 to be in a state of equal to or greater than −70° downward in the Z direction, it is possible to prevent the overall inclination of the see-through mirror 23 from becoming excessively large, which makes it easy to secure a space in which the inner lens is arranged inside the see-through mirror 23. Further, by setting the optical axis portion AX2 of the optical path P2 to be in a state of equal to or less than −45° downward in the Z direction, it is possible to prevent the prism mirror 22 from being arranged so as to project significantly in the −Z direction or the back direction with respect to the see-through mirror 23, which makes it possible to prevent the thickness of the imaging optical system 12 from being increased. The optical path P3 from the see-through mirror 23 to the pupil position PP is in a state close to parallel to the Z direction. That is, in the optical path P3, the optical axis portion AX3 extends substantially parallel to the −Z direction or the backward direction.

The display driving unit 102 will be described in detail with reference to FIG. 3. In FIG. 3, a region AR1 illustrates a side cross-sectional view of the optical unit 16, that is, the imaging optical system 12, and a region AR2 illustrates a partial planar structure of the imaging optical system 12. In the drawing of the planar structure illustrated in the region AR2, a partial beam from the prism mirror 22 toward the pupil position PP via the see-through mirror 23 is illustrated.

A side end 11e of the image element 11 that constitutes the display driving unit 102 is held by a pair of supporting members 33 provided at the holding member 30 that is fixed in the case 51 illustrated by a dot-dash line. By these support members 33, the alignment of the image element 11 in the case 51 is achieved. A side end 21e of the projection lens 21 that constitutes the display driving unit 102 is also held by the pair of support members 33, and the alignment of the projection lens 21 with respect to the case 51 is achieved. A side end 22e of the prism mirror 22 that constitutes the display driving unit 102 is also held by the pair of support members 33, and the alignment of the prism mirror 22 with respect to the case 51 is achieved. In the illustrated example, the end 21e of the projection lens 21 is arranged in the case 51, but the end 21e can be exposed to the outside on the side wall of the case 51 or the main body 52. Similarly, the end 22e of the prism mirror 22 need not be arranged in the case 51, and the end 22e can be exposed to the outside on the side wall of the case 51 or the main body 52. Note that the main body 52 of the case 51 can be formed by combining, for example, frame members divided in half on a plane parallel to the YZ plane, and when joining these frame members, the image element 11, the projection lens 21, and the like can be incorporated therein together with the support member 33.

The case 51 is not limited to the case formed by two parts, but may be formed by three or more parts.

Although not illustrated in the drawings, the first diaphragm member 31 arranged between the projection lens 21 and the prism mirror 22 is supported by the holding member 30 as a part of the holding member 30. The second diaphragm member 32 arranged at the light emission side of the prism mirror 22 is also supported by the holding member 30 as a part of the holding member 30.

The projection lens 21 is a single lens. The incident surface 21a and the emission surface 21b, which are the optical surfaces constituting the projection lens 21, are asymmetric with respect to the optical axis AX in up-down first directions D11 and D12 that intersect with the optical axis AX and that are parallel to the YZ plane, and are symmetric with respect to the optical axis AX in a lateral second direction D02 or the X direction orthogonal to the first directions D11 and D12. The up-down first direction D11 with respect to the incident surface 21a and the up-down first direction D12 with respect to the emission surface 21b form a predetermined angle.

The projection lens 21 is made of, for example, resin, but may also be made of glass. The incident surface 21a and the emission surface 21b of the projection lens 21 are, for example, free curved surfaces. The incident surface 21a and the emission surface 21b are not limited to the free curved surfaces, and may be aspheric surfaces. In the projection lens 21 described above, an aberration reduction can be achieved by setting the incident surface 21a and the emission surface 21b to be free curved surfaces or aspheric surfaces, and, particularly when a free curved surface is used, the optical performance of the eccentric system can be improved, and therefore an aberration of the imaging optical system 12 that is a non-coaxial off-axis optical system 112 can be easily reduced. Note that the free curved surface is a surface without an axis of rotational symmetry, and various polynomials may be used as a surface function of the free curved surface. In addition, the aspheric surface is a surface having an axis of rotational symmetry and expressed by a polynomial, but is a paraboloid or a surface other than a spherical surface. Although detailed illustration is omitted, an antireflection film is formed on the incident surface 21a and the emission surface 21b.

The prism mirror 22 is a refractive reflection optical member having a function of combining a mirror and a lens, and reflects the imaging light ML from the projection lens 21 while refracting the imaging light ML. More specifically, in the prism mirror 22, the imaging light ML is incident inside thereof via the light incident surface 22a which is the refraction surface, and is totally reflected in the non-front direction by the inner reflection surface 22b which is the reflection surface, and is emitted to the outside via the light emission surface 22c, which is the refraction surface. The light incident surface 22a and the light emission surface 22c are optical surfaces formed of curved surfaces, and contribute to the improvement of resolution as compared with the case where only the reflection surface is used or when these are flat surfaces. The light incident surface 22a, the inner reflection surface 22b, and the light emission surface 22c, which are the optical surfaces constituting the prism mirror 22, are asymmetric with respect to the optical axis AX in up-down first directions D21, D22, and D23 that intersect with the optical axis AX and that are parallel to the YZ plane, and are symmetric with respect to the optical axis AX in a lateral second direction D02 or the X direction orthogonal to the first directions D21, D22, and D23.

The prism mirror 22 is made of, for example, resin, but may also be made of glass. The refractive index of the main body of the prism mirror 22 is set to a value such that total reflection on the inner surface is achieved with reference to the reflection angle of the imaging light ML. It is desirable that the refractive index and the Abbe's number of the main body of the prism mirror 22 are set in consideration of the relationship with the projection lens 21. In particular, by increasing the Abbe's number of the prism mirror 22 and the projection lens 21, the color dispersion remaining as a whole is reduced.

The optical surface of the prism mirror 22, that is, the light incident surface 22a, the inner reflection surface 22b, and the light emission surface 22c are, for example, free curved surfaces. The light incident surface 22a, the inner reflection surface 22b, and the light emission surface 22c are not limited to the free curved surfaces, and may be aspheric surfaces. In the prism mirror 22, an aberration reduction can be achieved by setting the optical surfaces 22a, 22b, and 22c to be free curved surfaces or aspheric surfaces, and, particularly when a free curved surface is used, the optical performance of the eccentric system can be easily improved. That is, it becomes easy to reduce the aberration of the imaging optical system 12 which is the non-coaxial off-axis optical system 112, and the resolution can be improved. The inner reflection surface 22b is not limited to the reflection surface that reflects the imaging light ML by total reflection, and may be a reflection surface made of a metal film or a dielectric multilayer film. In this case, a reflective film made of a single-layer film or a multilayer film formed of a metal such as Al or Ag is deposited on the inner reflection surface 22b by vapor deposition or the like, or a sheet-shaped reflective film formed of a metal is attached to the inner reflective surface 22b. Although detailed illustration is omitted, an antireflection film is formed on the light incident surface 22a and the light emission surface 22c.

Figure 4A:
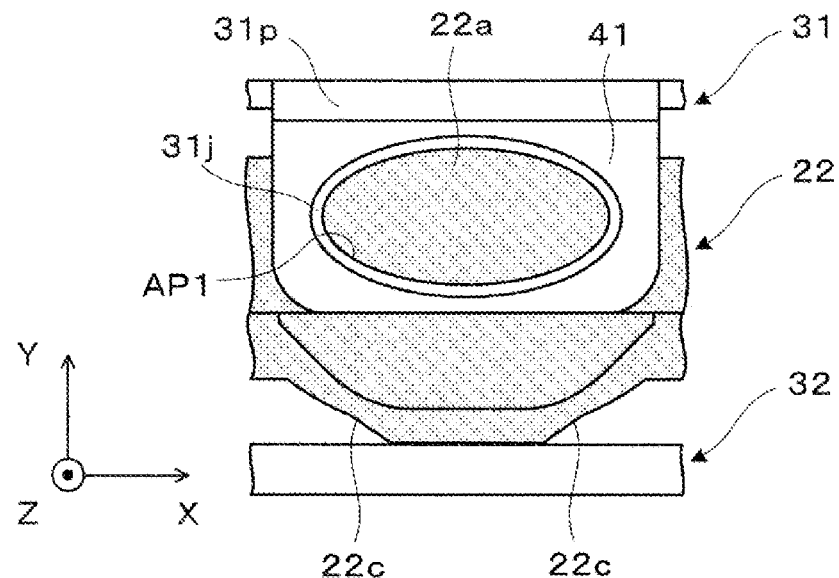
FIG. 4A is a front view illustrating an arrangement of a diaphragm member with respect to a prism mirror.
Figure 4B:
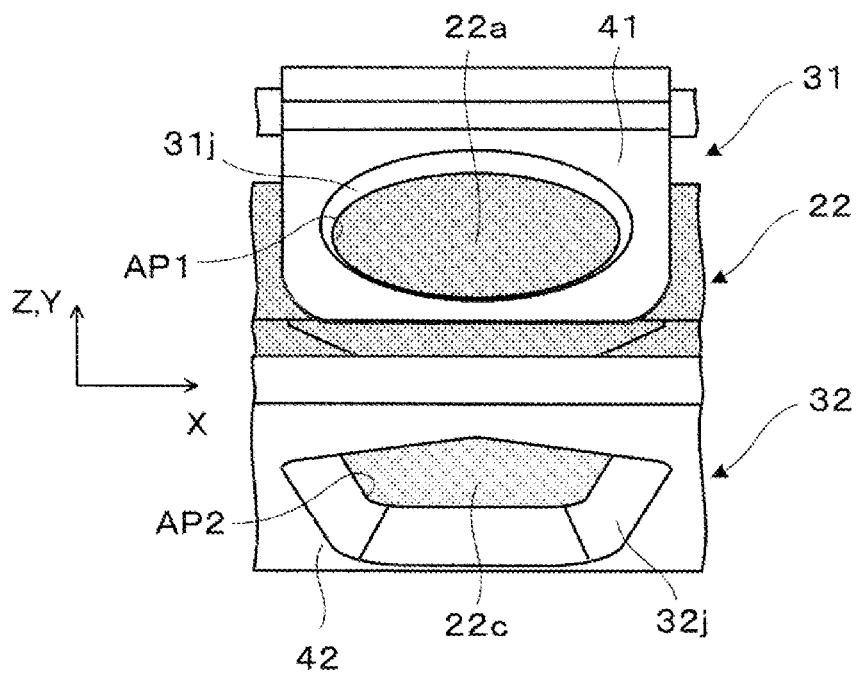
FIG. 4B is a perspective view illustrating the arrangement of the diaphragm member with respect to the prism mirror.
Figure 4C:
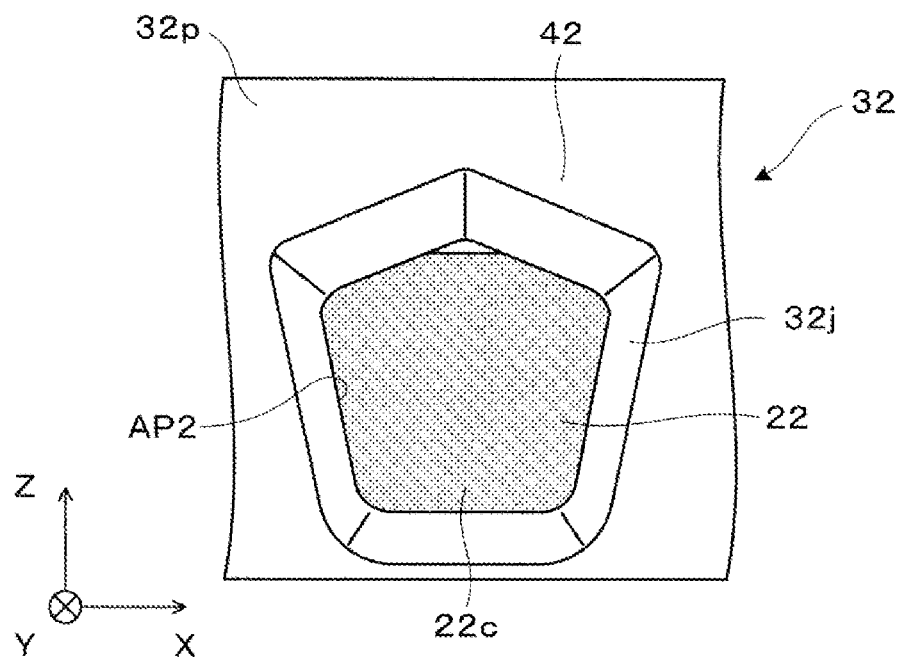
FIG. 4C is a bottom view illustrating the arrangement of the diaphragm member with respect to the prism mirror.

The shapes and arrangements of the first diaphragm member 31 and the second diaphragm member 32 will be described with reference to FIGS. 4A to 4C. FIG. 4A is a front view mainly illustrating the first diaphragm member 31 viewed from the +Z side, and FIG. 4B is a perspective view illustrating the first diaphragm member 31 and the second diaphragm member 32 viewed from the +Z and −Y sides. FIG. 4C is a bottom view mainly illustrating the second diaphragm member 32 viewed from the −Y side.

The first diaphragm member 31 has a first aperture AP1 arranged in the vicinity of the light incident surface 22a of the prism mirror 22, and the periphery of the first aperture AP1 functions as the basic aperture diaphragm 41. The first diaphragm member 31 is made of a resin material or a metal material. The first aperture AP1 is not circular but elliptical. By making the shape elliptical in this way, it is possible to efficiently transmit the necessary imaging light ML without waste, and to avoid the passage of unnecessary light as much as possible. A slope 31j is formed at the basic aperture diaphragm 41 around the first aperture AP1 in order to prevent the necessary light from being blocked. In the first diaphragm member 31, an upper portion 31p is a portion for attaching the first diaphragm member 31 to the holding member 30 illustrated in FIG. 3.

The second diaphragm member 32 has a second aperture AP2 arranged in the vicinity of the light emission surface 22c of the prism mirror 22, and the periphery of the second aperture AP2 functions as the additional aperture diaphragm 42. The second diaphragm member 32 is made of a resin material or a metal material. The second aperture AP2 is not circular but is a pentagon with rounded corners. The additional aperture diaphragm 42 or the second aperture AP2 has an asymmetrical shape whose shape is changed when inverted in the first direction (here, the Z direction). Specifically, when the center of the second aperture AP2 is fixed and the second aperture AP2 is rotated by 180° around a rotation axis extending in the X direction that is perpendicular to the first direction, the width in the X direction is reversed. The size of the luminous flux of the imaging light ML passing through the additional aperture diaphragm 42 varies depending on a position in the first direction, and by making the shape a pentagon that is asymmetrical in the first direction in this way, it is possible to efficiently transmit the necessary imaging light ML without waste, and to avoid the passage of unnecessary light as much as possible. That is, by the pentagonal additional aperture diaphragm 42, finer light-shielding of the imaging light ML can be performed. A slope 32j is formed at the additional aperture diaphragm 42 around the second aperture AP2 in order to prevent the necessary light from being blocked. The second diaphragm member 32 is formed of a member having a thickness greater than that of the first diaphragm member 31. In the second diaphragm member 32, an outer peripheral portion 32p is a portion for attaching the second diaphragm member 32 to the holding member 30 illustrated in FIG. 3.

Figure 5A:
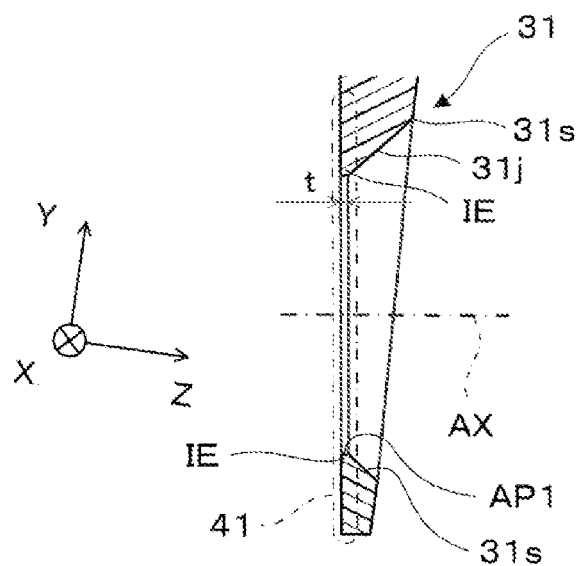
FIG. 5A is a conceptual cross-sectional view of a first diaphragm member.

As illustrated in FIG. 5A, the first diaphragm member 31 is a wedge-shaped member and has the first aperture AP1 that opens around the optical axis AX. The first diaphragm member 31 is not limited to the wedge-shaped member, and may have various shapes including a parallel flat plate. In the first diaphragm member 31, an inner edge IE that defines the first aperture AP1 has a thickness t equal to or less than 1 mm. As illustrated, the occurrence of stray light can be suppressed by providing the slope 31j and reducing the thickness t of the edge IE. The first diaphragm member 31 can be made of a light-absorbing base material, but when made of a light-transmitting base material, the surface thereof can be coated with the light-absorbing material. The coating is formed by coating, vapor deposition, plating, and the like. A surface 31s of the first diaphragm member 31 can also be processed to improve the scattering property. The basic aperture diaphragm 41 including the edge IE may be a separate member attached to the main body of the first diaphragm member 31 or inserted into the gap of the main body of the first diaphragm member 31.

The imaging light ML passing through the first diaphragm member 31 will be described with reference to FIG. 5B. The luminous flux of imaging light MLa emitted from the center of the display surface 11a of the image element 11 passes through a region near the center of the elliptical first aperture AP1, the luminous flux of imaging light MLb emitted from the right end of the display surface 11a of the image element 11 when viewed from the +Z side passes through a region on the right side of the elliptical first aperture AP1, and the luminous flux of imaging light MLc emitted from the left end of the display surface 11a of the image element 11 when viewed from the +Z side passes through a region on the left side of the elliptical first aperture AP1. As a result, when considering a horizontal cross section that crosses the center of the display surface 11a in the X direction, the luminous flux that contributes to the imaging from each point on the display surface 11a passes through the basic aperture diaphragm 41 without being blocked by the basic aperture diaphragm 41. On the other hand, an envelope of a series of the luminous flux of the imaging light MLa, MLb, MLc, and the like is a similar elliptical shape that is slightly smaller than that of the first aperture AP1, and thus the basic aperture diaphragm 41 blocks most of the light beams that do not contribute to the imaging. However, the basic aperture diaphragm 41 slightly allows the passage of unnecessary light in the lateral direction. That is, there is a gap GA between the first aperture AP1 and the left and right outside of the luminous flux of the imaging light MLa, that is, on the outside in the ±Z direction. Similarly, there is a gap between the first aperture AP1 and the left outside of the right imaging light MLb, that is, on the outside in the −Z direction, and there is a gap between the first aperture AP1 and the right outside of the left imaging light MLc, that is, on the outside in the +Z direction. In order to reduce the influence of such a gap GA, by providing the second diaphragm member 32 illustrated in FIG. 4C or the like, unnecessary light in the lateral direction passing through the first aperture AP1 can be cut.

The imaging light ML passing through the second diaphragm member 32 will be described with reference to FIG. 5C. The luminous flux of the imaging light MLa emitted from the center of the display surface 11a of the image element 11 passes through a region near the center of the pentagonal second aperture AP2, the luminous flux of imaging light MLf emitted from the lower end of the display surface 11a of the image element 11 when viewed from the +Z side passes through a region on the front side or +Z side of the second aperture AP2, and the luminous flux of imaging light MLg emitted from the upper end of the display surface 11a of the image element 11 when viewed from the +Z side passes through a region on the back side or −Z side of the second aperture AP2. As a result, when considering a vertical cross section that vertically crosses the center of the display surface 11a in the X direction, the luminous flux that contributes to the imaging from each point on the display surface 11a passes through the additional aperture diaphragm 42 without being blocked by the additional aperture diaphragm 42. On the other hand, an envelope of a series of the luminous flux of the imaging light MLa, MLf, MLg, and the like is a similar shape that is slightly smaller than that of the second aperture AP2, and the additional aperture diaphragm 42 blocks most of the light beams that do not contribute to the imaging. However, the additional aperture diaphragm 42 considerably allows the passage of unnecessary light in the up-down direction. In other words, there is a significant gap between the series of luminous flux of each imaging light MLa, MLf, MLg, and the like, and the second aperture AP2, however, the light beams passing through these gaps are cut in advance by the first diaphragm member 31 or the basic aperture diaphragm 41 and hardly reaches the second diaphragm member 32.

Figure 5B:
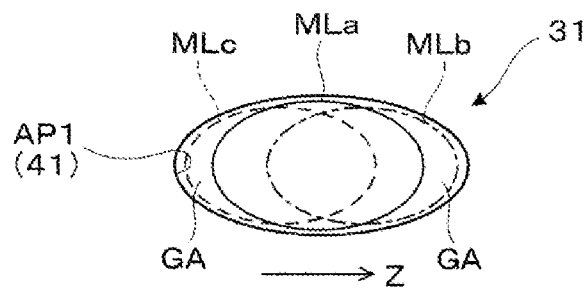
FIG. 5B is a conceptual diagram illustrating a state of a light beam passing through a basic aperture diaphragm.
Figure 6A:
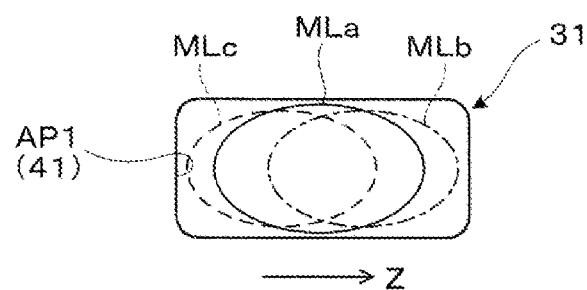
FIG. 6A is a conceptual diagram illustrating a modified example of the first diaphragm member, which is the basic aperture diaphragm.

FIG. 6A is a diagram illustrating a modified example of the first diaphragm member 31 illustrated in FIG. 5B. In this case, the first diaphragm member 31 or the basic aperture diaphragm 41 has a rectangular first aperture AP1. Although not illustrated, the first aperture AP1 may be oval. The shape of the first aperture AP1 can be appropriately set according to the size and arrangement of the imaging light MLa, MLf, and MLg.

Figure 5C:
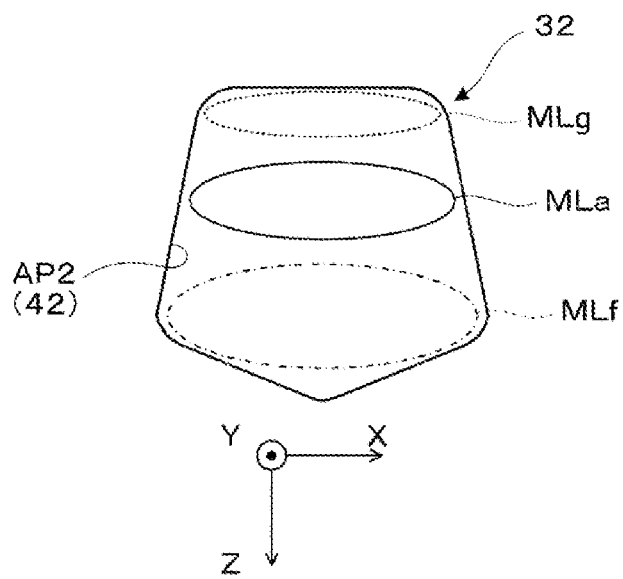
FIG. 5C is a conceptual diagram illustrating a state of the light beam passing through an additional aperture diaphragm.
Figure 6B:
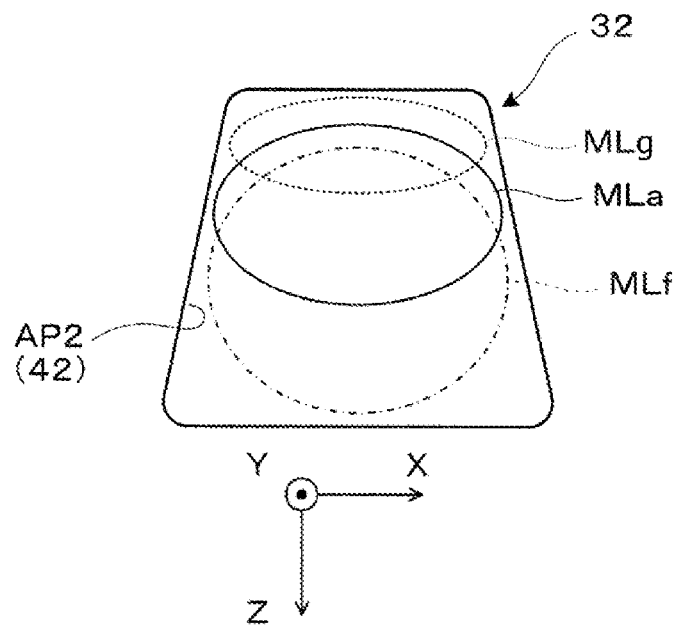
FIG. 6B is a conceptual diagram illustrating a modified example of a second diaphragm member, which is the additional aperture diaphragm.

FIG. 6B is a diagram illustrating a modified example of the second diaphragm member 32 illustrated in FIG. 5C. In this case, the second diaphragm member 32 or the additional aperture diaphragm 42 has a trapezoidal second aperture AP2. The additional aperture diaphragm 42 or the second aperture AP2 has an asymmetrical shape in the first direction (here, the Z direction).

Figure 7:
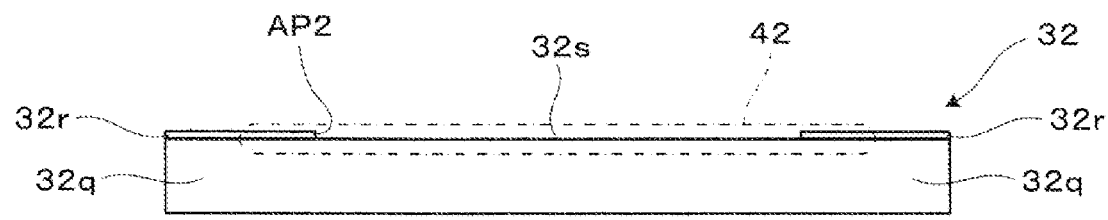
FIG. 7 is a conceptual cross-sectional view illustrating another modified example of the second diaphragm member.

FIG. 7 is a diagram illustrating another modified example of the second diaphragm member 32. In this case, a light-shielding mask 32r is formed on a light-transmitting flat plate 32q, and a window 32s provided on the mask 32r is used as the second aperture AP2, thereby obtaining the second diaphragm member 32. The second diaphragm member 32 is air-tightly bonded to a mounting hole (not illustrated) of the case 51 or the main body 52. As a result, the internal space of the case 51 is sealed from the outside, and the light emission surface 22c of the prism mirror 22 is prevented from being exposed to the externals. As a result, it is possible to prevent not only the light emission surface 22c, but also the light incident surface 22a of the prism mirror 22, the incident surface 21a and the emission surface 21b of the projection lens 21, and the like from being contaminated with dust or debris that has entered from the outside, or to prevent water droplets from adhering thereto, and thus deterioration of optical performance due to use can be suppressed. Note that the mask 32r may be a three-dimensional and thick mask that extends over the entire thickness of the second diaphragm member 32.

Returning to FIG. 3, the see-through mirror 23 is a plate-like optical member that functions as a concave surface mirror, and reflects the imaging light ML from the prism mirror 22. That is, the see-through mirror 23 reflects the imaging light ML from an emission region of the image source 10 toward the pupil position PP. The see-through mirror 23 covers the pupil position PP in which the eye EY or the pupil is arranged, and has a concave shape toward the pupil position PP, and has a convex shape toward the outside. The see-through mirror 23 is a concave transmission mirror that covers the entire effective region of the screen in the field of view. The see-through mirror 23 is a collimator having a converging function, and converges, a main beam that is emitted of the imaging light ML emitted from each point on the display surface 11a and that is once spread by imaging in the vicinity of the emission region of the image source 10, to the pupil position PP. The see-through mirror 23 is a mirror plate having a structure in which a mirror film 23c is formed on the front surface or the back surface of a plate-like body 23b. A reflection surface 23a of the see-through mirror 23 is transmissive. The see-through mirror 23 and the reflection surface 23a are asymmetric with respect to the optical axis AX in a up-down first direction D31 parallel to the YZ plane and intersecting the optical axis AX, and are symmetric with respect to the optical axis AX in a lateral second direction D02 or the X direction orthogonal to the first direction D31.

The reflection surface 23a of the see-through mirror 23 is, for example, a free curved surface. The reflection surface 23a is not limited to a free curved surface, and may be an aspheric surface. An aberration reduction can be achieved by setting the see-through mirror 23 to be a free curved surface or an aspheric surface, and, particularly when a free curved surface is used, an aberration of the imaging optical system 12 being an off-axis optical system or a non-coaxial optical system can be easily reduced. The see-through mirror 23 has a shape in which an origin of the curved surface expression is shifted toward the projection lens 21 side or the image element 11 side than the effective region of the see-through mirror 23 regardless of whether the reflection surface 23a is the free curved surface or the aspheric surface. In this case, the inclined surface of the see-through mirror that realizes the Z-shaped optical path can be set without imposing an excessive burden on the design of the optical system.

The see-through mirror 23 is a transmissive type reflection element that allows transmission of a part of light upon reflection, and the mirror film 23c of the see-through mirror 23 is formed of a reflection layer having semi-transmissive property. As a result, external light OL passes through the see-through mirror 23, and thus see-through view of externals is enabled, and a virtual image can be superimposed on an external image. At this time, when the plate-like body 23b has a thickness of less than or equal to approximately few millimeters, a change in magnification of the external image can be suppressed to low. A reflectance of the mirror film 23c with respect to the imaging light ML and the external light OL is set to be greater than or equal to 10% and less than or equal to 50% in a range of an incident angle of the assumed imaging light ML in terms of securing luminance of the imaging light ML and facilitating the observation of an external image by see-through. The plate-like body 23b which is the base material of the see-through mirror 23 is made of, for example, resin, but may also be made of glass. The plate-like body 23b is made of the same material as the support plate 61 that supports the plate-like body 23b from the periphery thereof, and has the same thickness as the support plate 61. The mirror film 23c is formed of, for example, a dielectric multilayer film including a plurality of dielectric layers having a film thickness adjusted. The mirror film 23c may also be a single layer film or a multilayer film of metal such as Al and Ag having a film thickness adjusted. The mirror film 23c may be formed by lamination, but may also be formed by bonding a sheet-shaped reflective film. An antireflection film is formed at an outer surface 23o of the plate-like body 23b.

In this imaging optical system 12, an intermediate pupil IPa in the up-down direction is arranged at or in the vicinity of the position of the light incident surface 22a of the prism mirror 22. The intermediate pupil IPa in the up-down direction refers to a location where the imaging light MLa, MLb, and MLc from each point on a up-down line segment that extends in the ±Y direction from the center of the display surface 11a of the image element 11 (see FIG. 5B) spread in up-down direction and largely overlap to each other, and the intermediate pupil IPa is arranged at the conjugate point of the eye ring ER or the pupil position PP. The up-down intermediate pupil IPa is at a position where main beams Pa (see FIG. 2) of the imaging light MLa, MLb, and MLc intersect. As described above, the first aperture member 31 or the first aperture AP1 of the basic aperture diaphragm 41 is arranged in the vicinity of the intermediate pupil IPa in the up-down direction, and functions as an aperture diaphragm with respect to the up-down direction.

An intermediate pupil IPb in the lateral direction is arranged at or in the vicinity of the position of the light emission surface 22c of the prism mirror 22. The intermediate pupil IPb in the lateral direction refers to a location where the imaging light MLa, MLf, and MLg from each point on a lateral line segment that extends in the ±X direction from the center of the display surface 11a of the image element 11 (see FIG. 5C) laterally spread and relatively largely overlap to each other, and the intermediate pupil IPb is arranged at the conjugate point of the eye ring ER or the pupil position PP. The lateral intermediate pupil IPb is at a position where main beams Pb (see the region AR2 in FIG. 3) of the imaging light MLa, MLf, and MLg intersect. As described above, the second aperture member 32 or the second aperture AP2 of the additional aperture diaphragm 42 is arranged in the vicinity of the intermediate pupil IPb in the lateral direction, and functions as an aperture diaphragm with respect to the lateral direction.

As described above, in the display device 100 of the present embodiment, a position where one of the main beams Pa intersect and a position where the other of the main beams Pb intersect are at different positions separated along the optical axis AX, in different directions orthogonal to the optical axis, in other words, in the up-down first direction parallel to the YZ plane and the lateral second direction parallel to the X-axis. Here, the up-down first direction corresponds to the first directions D21 and D23 in the incident surface 22a and the emission surface 22c of the prism mirror 22, and the lateral second direction corresponds to the second direction D02 in the incident surface 22a and the emission surface 22c of the prism mirror 22. In the different positions where the main beams Pa intersect and the main beams Pb intersect in the vertically and laterally different directions, the first diaphragm member 31 or the basic aperture diaphragm 41 is arranged at a first position upstream in the optical path or in the vicinity thereof, and the second diaphragm member 32 or the additional aperture diaphragm 42 is arranged at a second position downstream in the optical path or in the vicinity thereof. In other words, the plurality of aperture diaphragms 41 and 42 are each arranged at different positions at which the main beams intersect in the different directions that are orthogonal to the optical axis AX, or in the vicinity thereof.

An intermediate image IM is formed between the prism mirror 22 and the see-through mirror 23. The intermediate image IM is formed closer to the prism mirror 22 than to the see-through mirror 23. In this way, the intermediate image IM is formed closer to the prism mirror 22 than the see-through mirror 23, thereby reducing the burden of magnification by the see-through mirror 23, and thus aberration of the observed virtual image can be suppressed. The intermediate image IM is a real image formed at a position upstream of the optical path from the eye ring ER and conjugated with the display surface 11a, and has a pattern corresponding to the display image on the display surface 11a, but need not be sharply formed, and may exhibit various aberrations such as field curvature, distortion aberration, and the like.

Explaining the optical path, the imaging light ML from the image element 11 is incident on the projection lens 21 and emitted therefrom in a state of being substantially collimated. The imaging light ML that has passed through the projection lens 21 is incident on the prism mirror 22 via the basic aperture diaphragm 41, and passes through the light incident surface 22a while being refracted, and is reflected by the inner reflection surface 22b at a high reflectance close to 100%, and then is refracted again by the light emission surface 22c. The imaging light ML from the prism mirror 22 is incident on the see-through mirror 23 via the additional aperture diaphragm 42 and is reflected by the reflection surface 23a at a reflectance of less than or equal to approximately 50%. The imaging light ML reflected by the see-through mirror 23 is incident on the pupil position PP at which the eye EY or pupil of the wearer US is arranged. The external light OL that has passed through the see-through mirror 23 and the support plate 61 around the see-through mirror 23 is also incident on the pupil position PP. In other words, the wearer US wearing the display device 100 can observe a virtual image by the imaging light ML with the virtual image superimposed on the external image.

Figure 8:
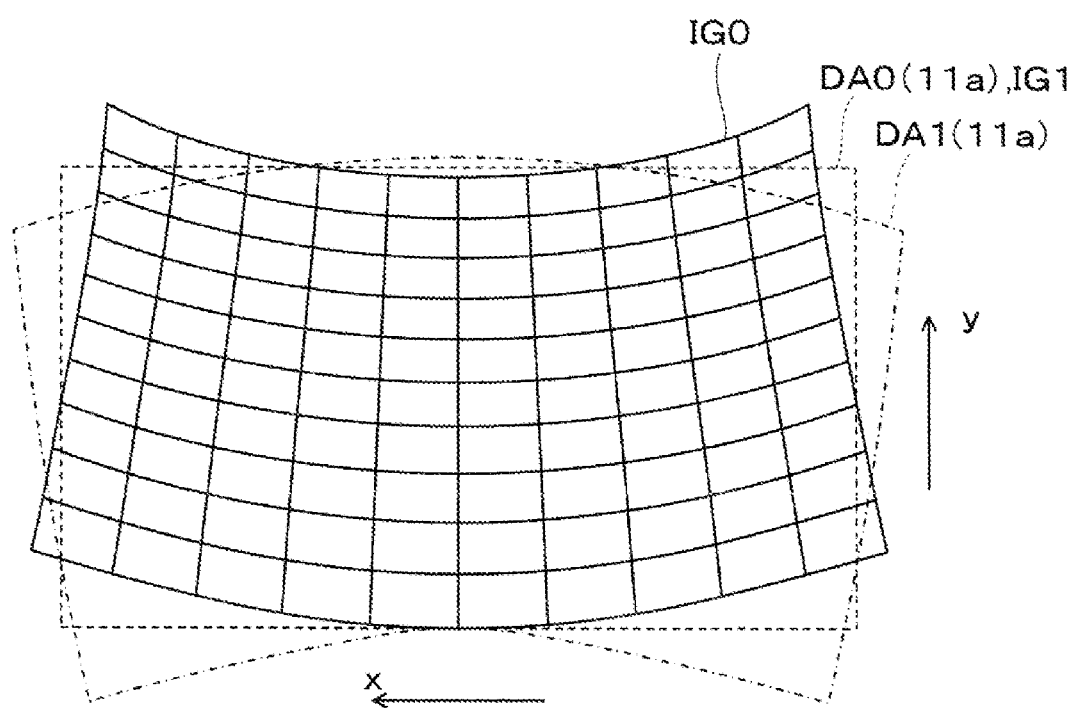
FIG. 8 is a diagram illustrating a compulsory distortion of a display image formed on the image element.

As illustrated in FIG. 8, an original projected image IG0 showing an imaging state by the imaging optical system 12 has relatively large distortion. In other words, the imaging optical system 12 forms distortion. Since the imaging optical system 12 is the off-axis optical system 112, it is not easy to remove all distortion such as the trapezoidal distortion. Therefore, even if distortion remains in the imaging optical system 12, when the original display image is DA0, the display image formed on the display surface 11a is preliminarily set to a corrected image DA1 with the distortion such as trapezoidal distortion. That is, by setting the image displayed on the image element 11 to have the reverse distortion that cancels the distortion formed by the projection lens 21, the prism mirror 22, and the see-through mirror 23, the pixel array of a projected image IG1 of the virtual image observed at the pupil position PP via the imaging optical system 12 can be a grid pattern corresponding to the original display image DA0, and the outline thereof can be rectangular. As a result, it is possible to suppress the aberration as a whole including the image element 11 while allowing the distortion aberration generated in the see-through mirror 23 and the like. As a result, the degree of freedom in the arrangement and size of the optical elements such as the prism mirror 22 is increased, and it is possible to easily secure the optical performance of the display device 100 while achieving the miniaturization of the display device 100.

Figure 9:
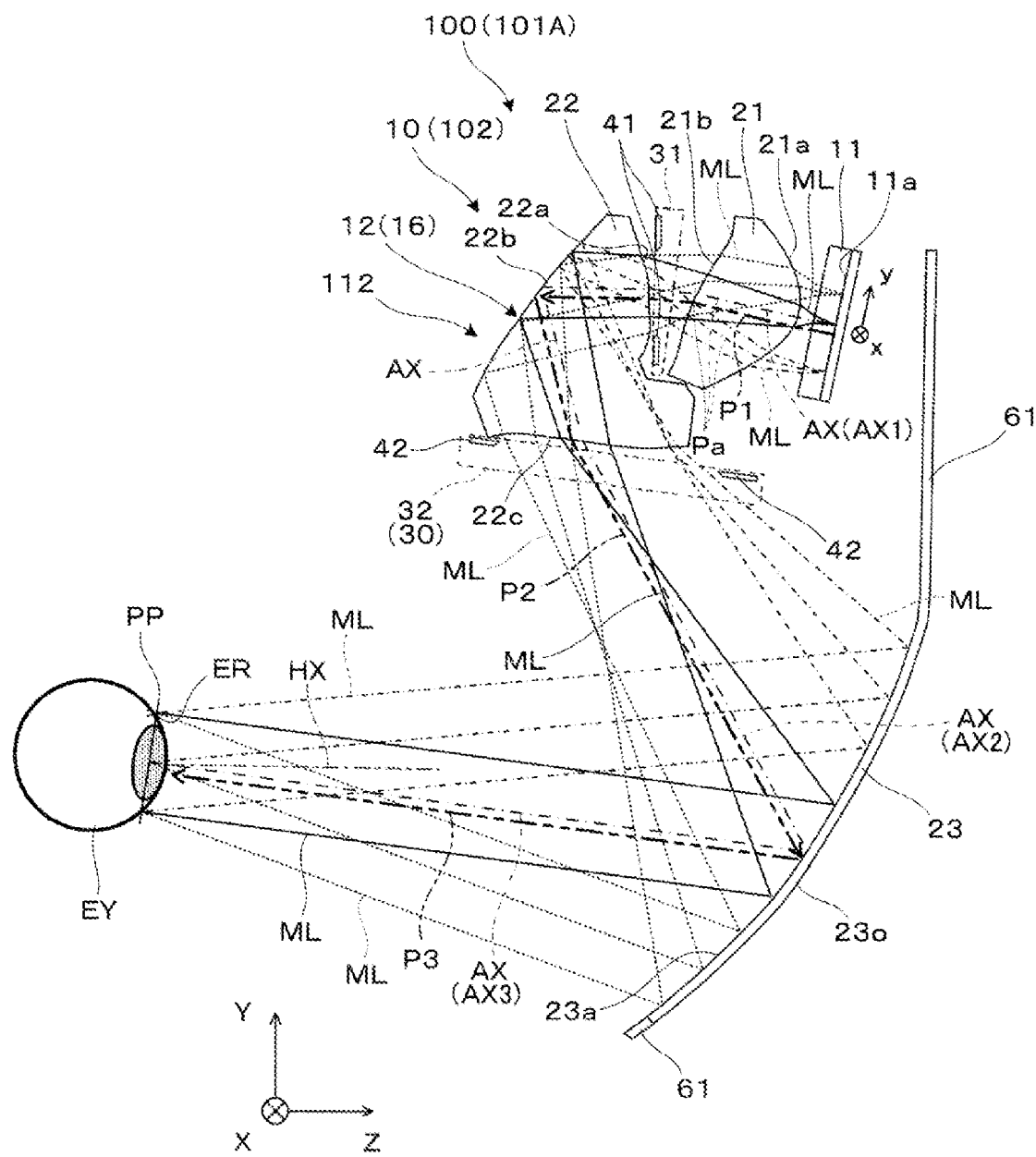
FIG. 9 is a side cross-sectional view illustrating the display device of a modified example.

As illustrated in FIG. 9, the optical axis portion AX3 of the optical path P3 can be approximately −10° in the +Z direction, with the downward direction in the +Z direction being negative. In this case, the entire optical system illustrated in FIG. 2 is rotated around the X-axis by approximately 10° in order to set the virtual image display or the field of view in the downwardly inclined direction. In this way, by setting the optical axis portion AX3 downward in the +Z direction with respect to a central axis HX, the line-of-sight of human is stabilized in a state of slightly downcast to incline downward by approximately 10° from the horizontal direction. The central axis HX extending in the horizontal direction with respect to the pupil position PP assumes a case where the wearer US wearing the display device 100 relaxes in an upright posture and faces the front, and gazes at the horizontal direction or the horizontal line. The shape and posture of the head including the arrangement of the eyes, the ears, and the like of each wearer US who wears the display device 100 varies. However, by assuming the average head shape or head posture of the wearer US, the average central axis HX can be set for the display device 100 that is focused on.

Since the display device 100 of the first exemplary embodiment described above includes the basic aperture diaphragm 41 that limits the passage of the imaging light ML outside the light incident surface 22a of the prism mirror 22, it is possible to block light that deteriorates the imaging while selectively transmitting the imaging light ML required for the imaging, and thus the imaging performance of the display device 100 can be improved.

Second Embodiment

Hereinafter, a display device and the like according to a second exemplary embodiment of the present disclosure will be described. Note that the display device according to the second exemplary embodiment is obtained by modifying a part of the display device according to the first exemplary embodiment, and description on common portions is omitted.

Figure 10:
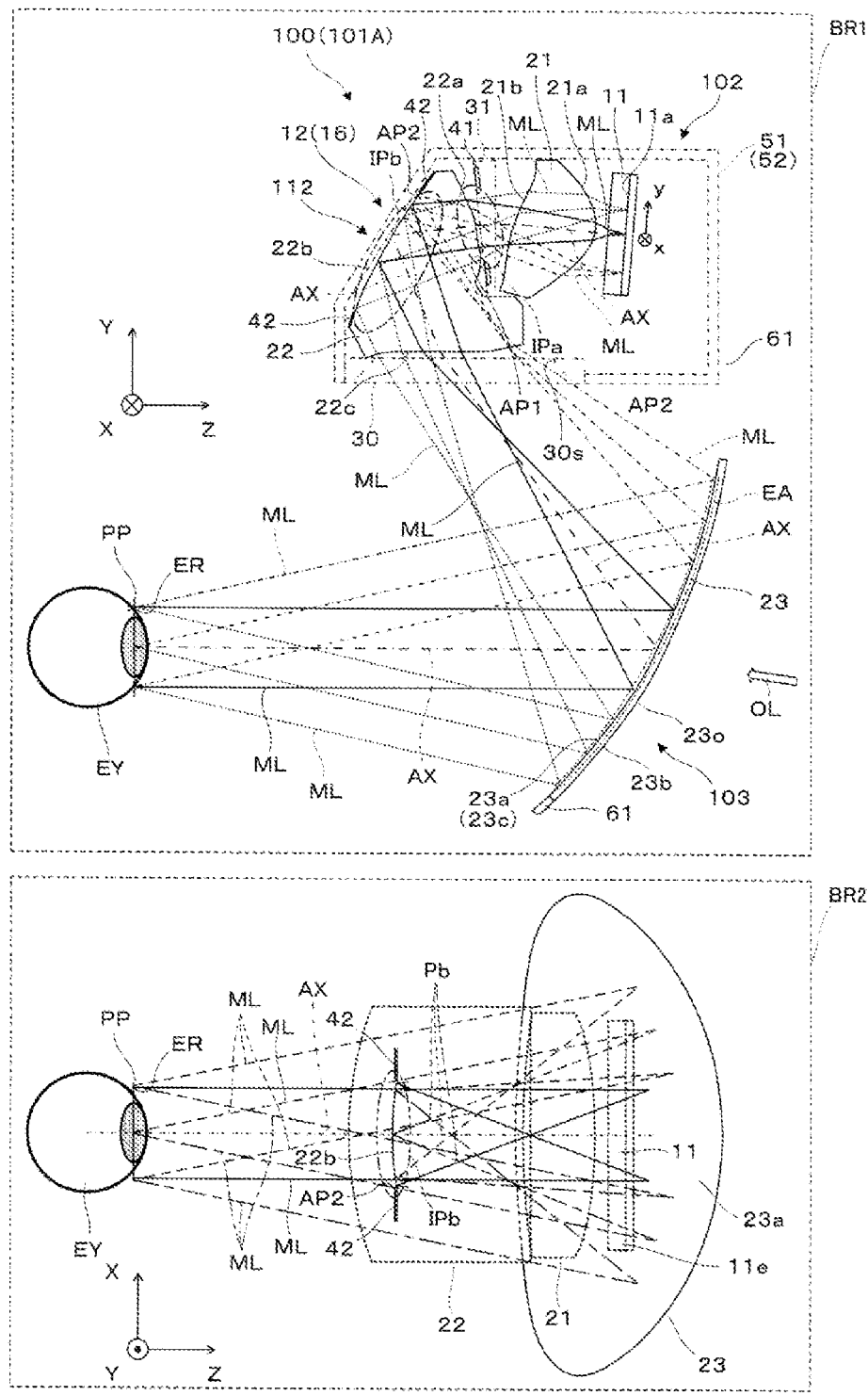
FIG. 10 is a side cross-sectional view and the like illustrating a structure of the display device of a second exemplary embodiment.

Hereinafter, a display device according to the second exemplary embodiment will be described with reference to FIG. 10. In FIG. 10, a region BR1 illustrates a side cross-sectional view of the imaging optical unit 16, and a region BR2 illustrates a partial planar structure of the imaging optical system 12.

In the case of the display device 100 of the present embodiment, the optical path in plan view illustrated in the region BR2 of FIG. 10 is changed so that the main beams Pb in the lateral direction are set to intersect in the vicinity of the inner reflection surface 22b of the prism mirror 22, and the intermediate pupil IPb is formed at this position.

Correspondingly, the additional aperture diaphragm 42 in the lateral direction is formed at the position of the inner reflection surface 22b of the prism mirror 22. In the holding member 30, an opening 30s is formed at a portion where the second diaphragm member 32 is formed, and functions as a light-shielding diaphragm.

Figure 11:
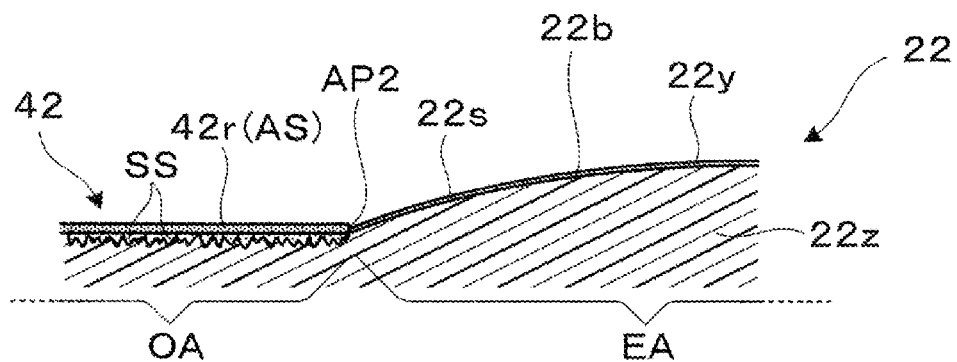
FIG. 11 is a partially enlarged cross-sectional view illustrating the additional aperture diaphragm formed at an inner reflection surface.

As illustrated in FIG. 11, the inner reflection surface 22b includes a reflection mirror 22y formed at an effective region EA that is surrounded by a light-shielding region OA, that allows propagation of the imaging light ML, and that corresponds to an optical surface region. The reflection mirror 22y is formed on a surface 22s that corresponds to the optical surface region of a base material 22z of the prism mirror 22. In this case, by arranging the reflection mirror 22y in the minimum necessary region, the reflection mirror 22y can indirectly function as the additional aperture diaphragm 42. Around the reflection mirror 22y, a mask 42r having a light-shielding property is formed on the base material 22z of the prism mirror 22, as an absorption structure AS provided in the light-shielding region OA. The mask 42r is formed by applying a sheet-shaped light-shielding body on the surface 22s, but the mask 42r is not limited thereto, and may be formed by coating, vapor-depositing, or the like using a light-shielding paint or a light-shielding substance. The absorption structure AS can suppress unintended stray light formed in the light-shielding region around the reflection mirror 22y. Further, a scattering structure SS is formed around the reflection mirror 22y as a base of the absorption structure AS. The scattering structure SS is obtained by roughening the surface 22s of the light-shielding region OA provided outside the effective region EA of the base material 22z of the prism mirror 22, and has fine and random irregularities. In this case, the scattering structure SS can suppress unintended stray light formed in the light-shielding region around the reflection mirror 22y. In the drawing, a bending is formed at the boundary between the effective region EA and the light-shielding region OA, but the boundary can also be a smooth curved surface.

In the above, in the light-shielding region OA, the absorption structure AS and the scattering structure SS are provided, but only one of the absorption structure AS and the scattering structure SS may be provided. The reflection mirror 22r can be a total reflection surface without a reflection member, such as a metal film.

Figure 12:
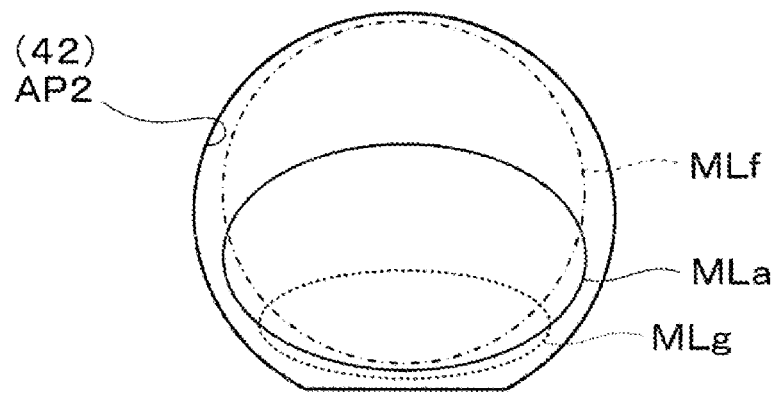
FIG. 12 is a conceptual diagram illustrating a state of the light beam passing through the additional aperture diaphragm.
Figure 12:
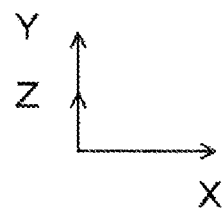

FIG. 12 is a conceptual diagram illustrating a state of imaging light passing through the additional aperture diaphragm 42. In this case, the additional aperture diaphragm 42 has the second aperture AP2 having a shape in which an arcuate portion that is a part of a circle is cut.

In the present embodiment, the first diaphragm member 31 or the basic aperture diaphragm 41 can be formed on the light incident surface 22a of the prism mirror 22 in the same manner as the additional aperture diaphragm 42. In this case as well, the same as the mask 42r or the like can be formed outside the effective region EA of the light incident face 22a, of the base material 22z of the prism mirror 22.

As in the present embodiment, when the imaging light ML collects in the vicinity of the light incident surface 22a of the prism mirror 22 in the first direction around the optical axis AX (here, corresponding to the up-down Y direction), unnecessary light can be blocked by the basic aperture diaphragm 41 arranged thereat, and when the imaging light ML collects in the vicinity of the inner reflection surface 22b of the prism mirror 22 in the second direction around the optical axis AX (here, corresponding to the lateral direction), the unnecessary light can be blocked by the additional aperture diaphragm 42 arranged thereat.

Modification Examples and Others

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

In the display device 100 of the above-described embodiment, the additional aperture diaphragm 42 is provided separately from the basic aperture diaphragm 41. However, when the optical path is designed such that the main beams Pb in the lateral direction intersect at a position near or not so far from the light incident surface 22a of the prism mirror 22, the intersections of the main beams Pa and Pb in the up-down and lateral directions become close to each other, and therefore the additional aperture diaphragm 42 can be omitted and only the basic aperture diaphragm 41 can function as a normal aperture diaphragm. On the other hand, when the optical path is designed such that the main beams Pa in the up-down direction intersect at a position near or not so far from the light emission surface 22b of the prism mirror 22, the intersections of the main beams Pa and Pb in the up-down and lateral directions become close to each other, and therefore the basic aperture diaphragm 41 can be omitted and only the additional aperture diaphragm 42 can function as the normal aperture diaphragm. When the aperture diaphragm is independently incorporated at the position of the additional aperture diaphragm 42 in this way, the aperture diaphragm independently incorporated at the position of the additional aperture diaphragm 42 is referred to as the basic aperture diaphragm.

The projection lens 11 is not limited to be constituted by a single lens, and can be constituted by a plurality of lenses.

The basic aperture diaphragm 41 and the additional aperture diaphragm 42 may be provided in two stages. That is, the basic aperture diaphragm 41 can be incorporated as a plurality of diaphragms arranged at different positions along the optical path direction, and the additional aperture diaphragm 42 can be also incorporated as a plurality of diaphragms arranged at different positions along the optical path direction.

In the display device 100 of the above-described embodiments, a self-luminous type display device such as an organic EL element, a LCD, and another light modulating element are used as the image element 11. Instead, a configuration in which a laser scanner obtained by combining a laser light source and a scanner, such as a polygon mirror, may also be used as the image element 11. That is, it is also possible to apply the present disclosure to a laser retinal projection-type head-mounted display.

A light control device that controls light by limiting transmitted light of the see-through mirror 23 may be attached to the external side of the see-through mirror 23. The light control device adjusts a transmittance, for example, electrically. Mirror liquid crystals, electronic shades, and the like may be used as the light control device. The light control device may adjust a transmittance according to external light brightness.

In the description above, the display device 100 is assumed to be mounted and used on a head, but the display device 100 described above may also be used as a hand-held display that is not mounted on a head and is viewed into it like a pair of binoculars. In other words, the head-mounted display also includes a hand-held display in the present disclosure.

The display device according to a specific aspect includes the image element, the projection lens configured to transmit the imaging light emitted from the image element, the prism mirror configured to cause the imaging light emitted from the projection lens to be incident on the light incident surface, to reflect the imaging light by the inner reflection surface, and to emit the imaging light from the light emission surface, thereby emitting the imaging light so that the imaging light is returned in the inclined direction, the see-through mirror configured to reflect the imaging light emitted from the prism mirror toward the pupil position, and the basic aperture diaphragm configured to limit the passage of the imaging light at the outside of one of the light incident surface and the light emission surface of the prism mirror.

Since the above-described display device includes the basic aperture diaphragm that limits the passage of the imaging light at the outside of the light incident surface or the light emission surface of the prism mirror, it is possible to block light that deteriorates the imaging while selectively transmitting the imaging light required for the imaging, and thus the imaging performance of the display device can be improved.

In the specific aspect, the basic aperture diaphragm is arranged between the projection lens and the prism mirror. A space is easily secured between the projection lens and the prism mirror, and the basic aperture diaphragm is easily arranged thereat.

In another aspect, an additional aperture diaphragm arranged so as to face the light emission surface of the prism mirror is further included. When the position where the imaging light emitted from the image element is collected differs in the direction around the optical axis, the same function as the general aperture diaphragm can be obtained by combining the basic aperture diaphragm and the additional aperture diaphragm. Specifically, when the imaging light collects in the vicinity of the light incident surface of the prism mirror in a specific direction around the optical axis, unnecessary light can be blocked by the basic aperture diaphragm arranged thereat, and when the imaging light collects in the vicinity of the light emission surface of the prism mirror in another direction around the optical axis, the unnecessary light can be blocked by the additional aperture diaphragm arranged thereat.

In another aspect, an additional aperture diaphragm formed at a position of the inner reflection surface of the prism mirror is further included. When the imaging light collects in the vicinity of the light incident surface of the prism mirror in a specific direction around the optical axis, unnecessary light can be blocked by the basic aperture diaphragm arranged thereat, and when the imaging light collects in the vicinity of the inner reflection surface of the prism mirror in another direction around the optical axis, the unnecessary light can be blocked by the additional aperture diaphragm arranged thereat.

In another aspect, the inner reflection surface includes a reflection mirror formed at an effective region that is surrounded by a light-shielding region and that allows propagation of the imaging light. In this case, by arranging the reflection mirror in the minimum necessary region, the reflection mirror can indirectly function as the additional aperture stop diaphragm.

In another aspect, the absorption structure provided in the light-shielding region around the reflection mirror is included. Unintended stray light formed in the light-shielding region around the reflection mirror can be suppressed by the absorption structure.

In another aspect, the scattering structure provided in the light-shielding region around the reflection mirror is included. Unintended stray light formed in the light-shielding region around the reflection mirror can be suppressed by the scattering structure.

In another aspect, the basic aperture diaphragm functions as an aperture diaphragm with respect to the first direction parallel to the predetermined plane that includes the optical axis of the imaging light incident on the prism mirror and the optical axis of the imaging light emitted from the prism mirror. The first direction corresponds to a direction in which the optical axis is deviated by the prism mirror.

In another aspect, the basic aperture diaphragm is arranged so as to correspond to the intermediate pupil position in the first direction. The basic aperture diaphragm does not have to exactly coincide with the position of the intermediate pupil in design, and may be arranged at a slightly offset position.

In another aspect, the intermediate pupil position is the position at which the plurality of main beams emitted from different pixel positions intersect in the first direction.

In another aspect, the additional aperture diaphragm functions as an aperture diaphragm with respect to the second direction perpendicular to the predetermined plane that includes the optical axis of the imaging light incident on the prism mirror and the optical axis of the imaging light emitted from the prism mirror. The second direction corresponds to a direction orthogonal to the direction in which the optical axis is deviated by the prism mirror.

In another aspect, the additional aperture diaphragm is arranged so as to correspond to the intermediate pupil position in the second direction.

In another aspect, the additional aperture diaphragm has a shape that is asymmetric in the first direction parallel to the predetermined plane. The size of the luminous flux of the imaging light passing through the additional aperture diaphragm may vary depending on the position in the first direction, and in such a case, it is possible to efficiently transmit the necessary imaging light without waste.

In another aspect, the basic aperture diaphragm is a part of the holding member that supports the prism mirror. In this case, the prism mirror and the basic aperture diaphragm can be collectively aligned and supported by the holding member. The additional aperture diaphragm can also be supported by the holding member.

In another aspect, the projection lens has a free curved surface, and the light incident surface, the inner reflection surface, and the light emission surface of the prism mirror are free curved surfaces. Since the display device includes the free curved surface, it becomes easy to improve the optical performance.

In another aspect, the imaging source is the off-axis optical system that is arranged along the predetermined reference plane and includes the optical axis portions that are inclined with respect to each other before and after the reflection surface.

In another aspect, the predetermined reference plane extends in the up-down direction.

In another aspect, the optical system including the prism mirror and the see-through mirror forms distortion. In this case, the degree of freedom in the arrangement and size of the optical elements such as the prism mirror is increased, and it is possible to easily secure the optical performance of the display device while achieving the miniaturization of the display device.

Another display device according to the specific aspect includes image element, the projection lens configured to transmit the imaging light emitted from the image element, the prism mirror configured to cause the imaging light emitted from the projection lens to be incident on the light incident surface, to reflect the imaging light by the inner reflection surface, and to emit the imaging light from the light emission surface, thereby emitting the imaging light so that the imaging light is returned in the inclined direction, and the see-through mirror configured to reflect the imaging light emitted from the prism mirror toward the pupil position, wherein the main beams intersect at different positions separated along the optical axis in different directions orthogonal to the optical axis, and the plurality of aperture diaphragms are each arranged at or in the vicinity of the different positions.

An optical unit according to one aspect of the present disclosure includes the projection lens configured to transmit the imaging light emitted from the image element, the prism mirror configured to cause the imaging light emitted from the projection lens to be incident on the light incident surface, to reflect the imaging light by the inner reflection surface, and to emit the imaging light from the light emission surface, thereby emitting the imaging light so that the imaging light is returned in the inclined direction, the see-through mirror configured to reflect the imaging light emitted from the prism mirror toward the pupil position, and the basic aperture diaphragm configured to limit passage of the imaging light at the outside of one of the light incident surface and the light emission surface of the prism mirror.

What is claimed is:

1. A display device comprising:
   an image element that emits an imaging light;
   a projection lens that transmits the imaging light;
   a prism mirror that has a light incident surface on which the imaging light emitted from the projection lens is incident, an inner reflection surface that reflects the imaging light from the light incident surface, and a light emission surface that emits the imaging light from the inner reflection surface;
   a see-through mirror that reflects the imaging light emitted from the light emission surface of the prism mirror toward a pupil position;
   a first diaphragm that limits passage of the imaging light and that is arranged at a position between the projection lens and the light incident surface of the prism mirror or a position between the light emission surface of the prism mirror and the see-through mirror,
   wherein the first diaphragm is a part of a holding member that supports the prism mirror, and the first diaphragm is arranged between the projection lens and the prism mirror; and
   a second diaphragm that is arranged between the light emission surface of the prism mirror and the see-through mirror.

2. The display device according to claim 1, further comprising:
   an additional aperture diagram that is integrated with the second diaphragm, that limits passage of the imaging light and that is formed at a position of the inner reflection surface of the prism mirror.

3. The display device according to claim 2, wherein
   the inner reflection surface includes an effective region that reflects the imaging light and a light-shielding region that surrounds the effective region and that reduces to reflect the imaging light.

4. The display device according to claim 3, wherein
   the light-shielding region includes an absorption structure that absorbs the imaging light.

5. The display device according to claim 3, comprising:
the light-shielding region includes a scattering structure that has irregularity.

6. The display device according to claim 1, wherein
the first diaphragm functions as an aperture diaphragm with respect to a first direction parallel to a predetermined plane that includes an optical axis of the imaging light incident on the prism mirror and an optical axis of the imaging light emitted from the prism mirror.

7. The display device according to claim 6, wherein
the first diaphragm is arranged so as to correspond to an intermediate pupil position in the first direction.

8. The display device according to claim 7, wherein
the intermediate pupil position is a position at which a plurality of main beams intersect with each other, the plurality of main beams being emitted from pixel positions that are different in the first direction.

9. The display device according to claim 1, wherein
the second diaphragm functions as an aperture diaphragm with respect to a second direction perpendicular to a predetermined plane that includes an optical axis of the imaging light incident on the prism mirror and an optical axis of the imaging light emitted from the prism mirror.

10. The display device according to claim 9, wherein
the second diaphragm is arranged so as to correspond to an intermediate pupil position in the second direction.

11. The display device according to claim 9, wherein
the second diaphragm has a shape that is asymmetric in the first direction parallel to the predetermined plane.

12. The display device according to claim 1, wherein
the projection lens has a free curved surface, and
the light incident surface, the inner reflection surface, and the light emission surface of the prism mirror are free curved surfaces.

13. The display device according to claim 1, wherein
the image element is an off-axis optical system that is arranged along a predetermined reference plane and includes optical axis portions that are inclined with respect to each other before and after a reflection surface.

14. The display device according to claim 13, wherein
the predetermined reference plane extends in a first direction parallel to a predetermined plane that includes an optical axis of the imaging light incident on the prism mirror and an optical axis of the imaging light emitted from the prism mirror.

15. The display device according to claim 1, wherein
a distortion is formed by an optical system including the prism mirror and the see-through mirror.

16. A display device comprising:
an image element that emits an imaging light;
a projection lens that transmits imaging light;
a prism mirror that has a light incident surface on which the imaging light emitted from the projection lens is incident, an inner reflection surface that reflects the imaging light from the light incident surface, and a light emission surface that emits the imaging light from the inner reflection surface; and
a see-through mirror that reflects the imaging light emitted from the prism mirror toward a pupil position, wherein
a plurality of main beams intersect at different positions separated along an optical axis in different directions orthogonal to the optical axis, and
a plurality of aperture diaphragms are each arranged at or in a vicinity of the different positions,
wherein the image element is an off-axis optical system that is arranged along a predetermined reference plane and includes optical axis portions that are inclined with respect to each other before and after a reflection surface, and
the predetermined reference plane extends in a first direction parallel to a predetermined plane that includes an optical axis of the imaging light incident on the prism mirror and an optical axis of the imaging light emitted from the prism mirror.

17. An optical unit comprising:
a projection lens that transmits an imaging light;
a prism mirror that has a light incident surface on which the imaging light emitted from the projection lens is incident, an inner reflection surface that reflects the imaging light from the light incident surface, and a light emission surface that emits the imaging light from the inner reflection surface;
a see-through mirror that reflects the imaging light emitted from the prism mirror toward a pupil position;
a diaphragm that limits passage of the imaging light and that is arranged at a position between the projection lens and the light incident surface or a position between the light emission surface of the prism mirror and the see-through mirror,
wherein the first diaphragm is a part of a holding member that supports the prism mirror, and the first diaphragm is arranged between the projection lens and the prism mirror; and
a second diaphragm that is arranged between the light emission surface of the prism mirror and the see-through mirror.

* * * * *